United States Patent
Hong (10) Patent No.: US 8,386,818 B2
(45) Date of Patent: Feb. 26, 2013

(54) DATA STORAGE DEVICE INCLUDING CURRENT DETECTOR

(75) Inventor: JuHyung Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 12/726,603

(22) Filed: Mar. 18, 2010

(65) Prior Publication Data

US 2010/0275050 A1 Oct. 28, 2010

(30) Foreign Application Priority Data

Apr. 27, 2009 (KR) .................. 10-2009-0036540

(51) Int. Cl.
*G06F 1/32* (2006.01)
*G06F 1/00* (2006.01)
*G11C 5/14* (2006.01)

(52) U.S. Cl. .................. 713/320; 713/324; 365/227

(58) Field of Classification Search .................. 713/324, 713/320

See application file for complete search history.

(56) References Cited

U.S. PATENT DOCUMENTS

| | | | | |
|---|---|---|---|---|
| 3,562,555 A | * | 2/1971 | Ahrons | 365/229 |
| 4,933,902 A | * | 6/1990 | Yamada et al. | 365/189.08 |
| 6,330,639 B1 | * | 12/2001 | Fanning et al. | 711/106 |
| 6,512,715 B2 | * | 1/2003 | Okamoto et al. | 365/227 |
| 7,437,579 B2 | * | 10/2008 | Jeddeloh et al. | 713/300 |
| 7,755,215 B2 | * | 7/2010 | Zhu et al. | 307/52 |
| 7,855,930 B2 | * | 12/2010 | Chen | 365/226 |
| 8,195,971 B2 | * | 6/2012 | Jiang | 713/324 |
| 2004/0012997 A1 | | 1/2004 | Mihara | |
| 2008/0192548 A1 | | 8/2008 | Shibata et al. | |

FOREIGN PATENT DOCUMENTS

| | | |
|---|---|---|
| JP | 2003-199329 | 7/2003 |
| JP | 2004-055012 | 2/2004 |
| JP | 2008-197807 | 8/2008 |
| KR | 2004-10064 | 1/2004 |
| KR | 2008-74790 | 8/2008 |

* cited by examiner

*Primary Examiner* — Suresh Suryawanshi
(74) *Attorney, Agent, or Firm* — Stanzione & Kim, LLP (57) ABSTRACT

Provided is a data storage device including a current detector. The data storage device includes a plurality of memory devices, a detector, and a power manager. The detector detects a current inputted from a power source. The power manager manages consumption power of the plurality of memory devices according to a result of the detection provided from the detector.

16 Claims, 8 Drawing Sheets

DATA STORAGE DEVICE INCLUDING CURRENT DETECTOR

CROSS-REFERENCE TO RELATED APPLICATIONS

This application claims priority under 35 U.S.C. §119 from Korean Patent Application No. 10-2009-0036540, filed on Apr. 27, 2009, the entire contents of which are hereby incorporated by reference.

BACKGROUND

1. Field of the Invention

The present general inventive concept relates to an electronic device, and more particularly, to a data storage device including a current detector.

2. Description of the Related Art

Generally, since flash memories have a function of electrically deleting data of a cell in a lump, the flash memories are being widely used in computers and memory cards. Recently, as the use of portable electronic devices such as mobile phones, PDAs, and digital cameras increases rapidly, the flash memories are being widely used as a storage device instead of Hard Disk Drives (HDDs).

With recent technological development and price reduction of flash memory devices, flash memories are being used as a storage medium to replace HDDs. The above storage devices are also called semiconductor disk devices, solid state drives, or solid state disks. Hereinafter, the storage devices will be briefly referred to as SSDs. High-speed data I/O is possible in an access operation to an SSD, and mechanical delay or error rate is significantly low. Also, the SSDs are not easily damaged by external impacts, and have excellent properties in generation of heat, noise, and power consumption. Furthermore, SSDs have the advantages of compactness and lightness. Accordingly, demands on SSDs that do not use a platter rotating mechanically are rapidly increasing in accordance with today's mobile trends of low-power and large-capacity.

One of the advantages of SSDs is a low power-consuming rate compared to HDDs. Nevertheless, as demands on large-capacity and high-performance increases recently, SSDs are being desperately required to have higher power efficiency.

SUMMARY

The present disclosure provides a data storage device, which can forecast and adjust a peak of a current that is being consumed.

Additional features and utilities of the present general inventive concept will be set forth in part in the description which follows and, in part, will be obvious from the description, or may be learned by practice of the general inventive concept.

Example embodiments of the present general inventive concept provide data storage devices including a plurality of memory devices, a detector to detect a current inputted from a power source, and a power manager to manage consumption power of the plurality of memory devices according to a result of the detection provided from the detector.

In example embodiments, the power manager may manage power in a normal mode that does not restrict the consumption power, and one of a plurality of low-power modes to adjust the consumption power to less than or equal to a predetermined level according to the result of the detection.

In example embodiments, the data storage device may further include a memory controller connected to the plurality of memory devices through a plurality of channels and to process an inputted command according to a control of the power manager.

In example embodiments, the plurality of low-power modes may include a wait mode to delay an execution of a command temporarily, a partial operation mode to execute the command partially, and a stop mode to pause an operation of the data storage device.

In example embodiments, the partial operation mode may be a mode that serially performs a plurality of detailed operations to execute the command.

In example embodiments, the partial operation mode may include at least one of a partial band activation mode to activate a portion of a plurality of channels, a partial interleaving mode to adjust one or more memory devices interleaving-accessed in an activated channel, and one or more low frequency modes to reduce a data transmission rate of an activated channel.

In example embodiments, when a magnitude of an inrush current is increased to be greater than or equal to a threshold current value, the power manager may switch an operation mode into one of the plurality of low-power modes.

In example embodiments, the plurality of memory devices, the detector, and the power manager may be provided in a Solid State Drive (SSD).

In exemplary embodiments of the present general inventive concept, data storage devices include a plurality of memory devices, and a memory controller to exchange data with the plurality of memory devices in response to one or more external commands, the memory controller to change an operation mode according to a pattern of the one or more external commands that are successively inputted.

In example embodiments, when the pattern of the one or more external commands is a pattern that consumes power that is greater than a predetermined level, the memory controller may access the plurality of memory devices using one of the plurality of low-power modes.

Exemplary embodiments of the present general inventive concept provide a method of operating a data storage device, the method including detecting a current level that is consumed by the data storage device, comparing the detected current with a predetermined threshold value, and when the detected current is greater than or equal to the predetermined threshold value, recovering the consumed current level to an optimum current level by selecting at least one operation mode from low-power operation modes with a controller of the data storage device.

The method may also include operating the data storage device in a normal mode when the detected current is less than the predetermined threshold value.

The method may also include where the selected at least one operation mode is a wait mode, a partial operation mode, and a stop mode.

The method may also include that when the wait mode is selected as the operation mode, delaying the execution of a received input command received by the controller and waiting for a predetermined period of time.

The method may also include that when the partial mode is selected as the operation mode, dividing the execution corresponding to the command received by the controller into a plurality of operations and executing the respective operations.

The method may include where the plurality of operations are executed serially.

The method may include that when the stop mode is selected as the operation mode, stopping one or more environments to drive the data storage device with the controller.

The method may include determining whether the magnitude of a changed current of the data storage device is reduced to the optimum current level.

The method may include that when the magnitude of the changed current is reduced to the optimum level, retuning the data storage device to a normal mode of operation.

The method may include that when the magnitude of the changed current is not reduced to the optimum level, changing the operation mode of the data storage device.

Exemplary embodiments of the present general inventive concept also provide a computing system having a data storage device, including at least one memory device, and a memory controller to exchange data with the plurality of memory devices in response to one or more external commands, the memory controller to change an operation mode according to a pattern of the one or more external commands that are successively inputted, a processor to request data to be stored and to be retrieved from the data storage device, and a system bus to communicatively couple the data storage device and the processor.

Exemplary embodiments of the present general inventive concept may also provide a computing system having a data storage device, including at least one memory device, a detector to detect a current inputted from a power source, and a power manager to manage consumption power of the plurality of memory devices according to a result of the detection provided from the detector, a processor to request data to be stored and to be retrieved from the data storage device, and a system bus to communicatively couple the data storage device and the processor.

Exemplary embodiments of the present general inventive concept may also provide a method of operating a data storage device, including forecasting a peak current of operation of the data storage device, and controlling at least one operation mode of the data storage device so as to not exceed a predetermined limit current value.

The method may also include that when the peak current exceeds the predetermined limit current value, controlling the data storage device with a controller and driving the data storage device in a low-power mode.

BRIEF DESCRIPTION OF THE DRAWINGS

The accompanying drawings are included to provide a further understanding of the present general inventive concept, and are incorporated in and constitute a part of this specification. The drawings illustrate exemplary embodiments of the present general inventive concept and, together with the description, serve to explain principles of the present general inventive concept. The above and/or other features of the present general inventive concept will become apparent and more readily appreciated from the following description of the exemplary embodiments, taken in conjunction with the accompanying drawings, in which.

DETAILED DESCRIPTION OF THE EMBODIMENTS

Exemplary embodiments of the present general inventive concept will be described below in more detail with reference to the accompanying drawings. The present general inventive concept may, however, be embodied in different forms and should not be construed as limited to the embodiments set forth herein. Rather, these embodiments are provided so that this disclosure will be thorough and complete, and will fully convey the scope of the present general inventive concept to those skilled in the art.

It should be construed that foregoing general illustrations and following detailed descriptions are exemplified and an additional explanation of claimed present general inventive concepts is provided. Reference numerals are indicated in detail in a preferred embodiment of the present general inventive concept, and their examples are represented in reference drawings. In every possible case, like reference numerals are used for referring to the same or similar elements in the description and drawings.

Hereinafter, a Solid State Drive (SSD) will be used as an example of a memory system to explain the features and functions of exemplary embodiments of the present general inventive concept. However, features and utilities of exemplary embodiments of the present general inventive concept set forth herein will be readily understood by persons skilled in the art. Although a NAND flash memory is described as an example of a storage medium, embodiments of the present general inventive concept are not limited thereto. For example, memories such as PRAM (Parameter Random Access Memory), MRAM (Magnetoresistive Random Access Memory), ReRAM (Resistive Random Access Memory), and NOR flash memories may be used as storage media. Furthermore, exemplary embodiments of the present general inventive concept may be applied to a memory system in which different kinds of memory devices are mixed.

The present general inventive concept may be embodied or applied through at least the example embodiments as described herein. The detailed descriptions may be amended or modified according to viewpoints and applications without departing from the scope, technical idea and other objects of the present inventive concept. Hereinafter, exemplary embodiments of the present general inventive concept will be described in detail with reference to the accompanying drawings.

Figure 1:
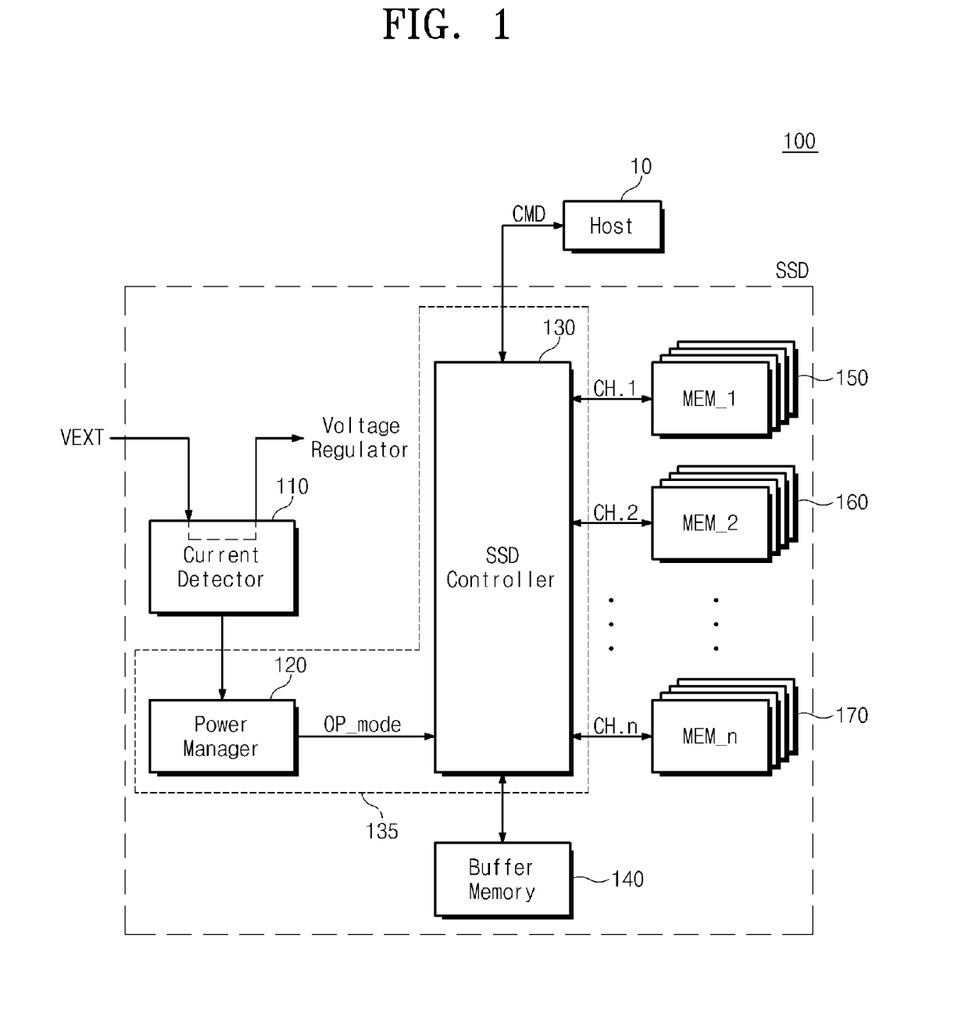
FIG. 1 is a block diagram illustrating a Solid State Drive (SSD) according to exemplary embodiments of the present general inventive concept.

FIG. 1 is a block diagram illustrating an SSD 100 according to example embodiments of the present general inventive concept. Referring to FIG. 1, the SSD 100 may include a current detector 110, a power manager 120, an SSD controller 130, a buffer memory 140, and memory devices 150, 160 and 170.

The current detector 110 may detect a magnitude of a consumed current that flows into the SSD 100 by a power voltage VEXT. Although not illustrated, the power voltage VEXT may be provided to a voltage regulator to supply driving power to respective components of the SSD 100 (e.g., the current detector 110, the power manager 120, the SSD controller 130, the buffer memory 140, and the memory devices 150, 160 and 170, etc.). Voltages of one or more levels converted by the voltage regulator may be provided to the components of the SSD 100. The power dissipation of the SSD 100 can be variable according to a driving condition, an operation mode, and/or any other suitable condition or mode to carry out the exemplary embodiments of the present general inventive concept as described herein. Even through the level of the power voltage VEXT may be fixed, a current supplied from a power source can be changed by the variable power dissipation.

The power manager 120 may determine whether to maintain the operation mode OP_mode of the SSD 100 in a normal mode or to change the operation mode OP_mode into a low-power mode according to at least level information of a current from the current detector 110. If the magnitude of the current flowing into the SSD 100 is greater than or equal to a threshold current value $I_{th}$, the power manager 120 may order the SSD controller 130 (e.g., the power manager 120 may provide an instruction, provide a control signal, etc. to the SSD controller 130) to drive the operation mode OP_mode for a received input command using one of a plurality of low-power modes. If the magnitude of the current flowing into the SSD 100 is smaller than (i.e., less than) the threshold current value $I_{th}$, the power manager 120 may order the SSD controller 130 (e.g., the power manager 120 may provide an instruction, provide a control signal, etc. to the SSD controller 130) to perform the operation mode OP_mode to execute the received input command according to the normal mode.

The SSD controller 130 may provide a physical connection between a host 10 and the SSD 100. The host 10 may be a personal computer, server, central processing unit (CPU), processor, controller, field programmable gate array, ASIC (Application Specific Integrated Circuit), cellphone, personal digital assistant, digital processing device, etc. that is communicatively coupled to the SSD 100 via a wired and/or wireless network, data bus, or data path. That is, the SSD controller 130 may provide an interfacing with the SSD 100 corresponding to a bus format of the host 10. Particularly, the SSD controller 130 may decode a command CMD provided from the host 10. According to a result of the decoding, the SSD controller 130 may perform an access operation to the memory device 150, 160 and 170 or the buffer memory 140. The SSD controller 130 may execute the command CMD using an operation condition according to the determined operation mode OP_mode.

In exemplary embodiments of the present general inventive concept without separate power management, the SSD controller 130 may access the memory devices 150, 160 and 170 or the buffer memory 140 according to the normal mode. If the power manager 120 orders the operation mode OP_mode to perform one of the low-power modes (e.g., the power manager 120 provides an instruction or a control signal to the SSD controller 130), the SSD controller 130 may adjust one or more parameters to perform a selected low-power mode. For example, the SSD controller 130 may pause the execution of the command CMD to enter a wait mode, or may control at least one the memory devices 150, 160 and 170 or the buffer memory 140 to at least partially perform one or more operations according to the command CMD. Alternatively, the SSD controller 130 may pause all operations of the SSD 100 according to the operation mode OP_mode.

Write data provided from the buffer memory 140 or data read out from the memory devices 150, 160 and 170 are temporarily stored in the buffer memory 140. When data present in the memory devices 150, 160 and 170 is cached upon a read request of the host, the buffer memory 230 may support a cache function of providing the cached data to the host directly. In this case, an access to the memory devices 150, 160 and 170 does not occur. Generally, the data transmission rate by the bus format (e.g., SATA (Serial AT Attachment), SAS (Serial Attached SCSI), or any other suitable bus format to carry out the exemplary embodiments of the present general inventive concept as described herein) of the host is greater than than the transmission rate of channels CH.1, CH.2, ..., CH.n in the SDD 100. That is, when the interface rate of the host is significantly high (i.e., greater than or equal to a predetermined data interface rate), the buffer memory 140 can minimize a reduction of performance generated by a rate difference.

The buffer memory 140 may include a synchronous DRAM to provide buffering in the SSD 100 when the SSD 100 may be used as a large-capacity auxiliary memory (e.g., when the host device 10 uses the SSD 100 as an auxiliary memory). However, it will be apparent to those skilled in the art that the buffer memory is not limited to this disclosure.

At least one of the memory devices 150, 160 and 170 may be provided as storage media of the SSD 100. For example, the memory devices 150, 160 and 170 may include NAND-type flash memories having large storage capability (e.g., a storage capacity that is greater than or equal to a predetermined storage capacity). A portion or all of the memory devices 150, 160 and 170 may be volatile DRAMs (Dynamic Random Access Memory) or SRAMs (Static Random Access Memory).

The respective memory devices 150, 160 and 170 may be connected to the SSD controller 130 by one or more channels (e.g., data channels CH. 1, CH. 2, ... CH.n as illustrated in FIG. 1). A plurality of memory devices may be connected to one channel. The plurality of memory devices can be connected to the same data bus, respectively. Flash memory devices will be described as an example of memory devices and/or storage media, but the memory devices may include other non-volatile memory devices. For example, PRAM, MRAM, ReRAM, FRAM (Ferroelectric Random Access Memory), and NOR flash memory may be used as a storage medium.

According to the features and/or utilities described above, the internal operation modes of the SSD 100 may be changed into a normal mode or a low-power mode according to the operation mode OP_mode by the power manager 120. That is, execution modes of received input commands may be varied according to the operation mode OP_mode generated by, for example, detecting an inrush current of the SSD 100. Accordingly, the execution mode of the commands may be determined according to, for example, the power consumed by the SSD 100. This may protect the SSD 100 and the host mounted with the SSD 100 from fatal power error.

Although the power manager 120 and the SSD controller 130 have been described as individual components, embodiments of the present general inventive concept are not limited thereto. That is, the power manager 120 may include the SSD controller 130. In this case, the power manager 120 and the SSD controller 130 may be referred to as a memory controller 135. The current detector 110 may be included in the SSD controller 130.

The memory controller 135 may monitor a detection current value from the current detector 110 to generate an operation mode OP_mode. The memory controller 135 may adjust the operation of the SSD 100 to the normal mode or one of the plurality of low-power modes according to the operation mode OP_mode.

Figure 2:
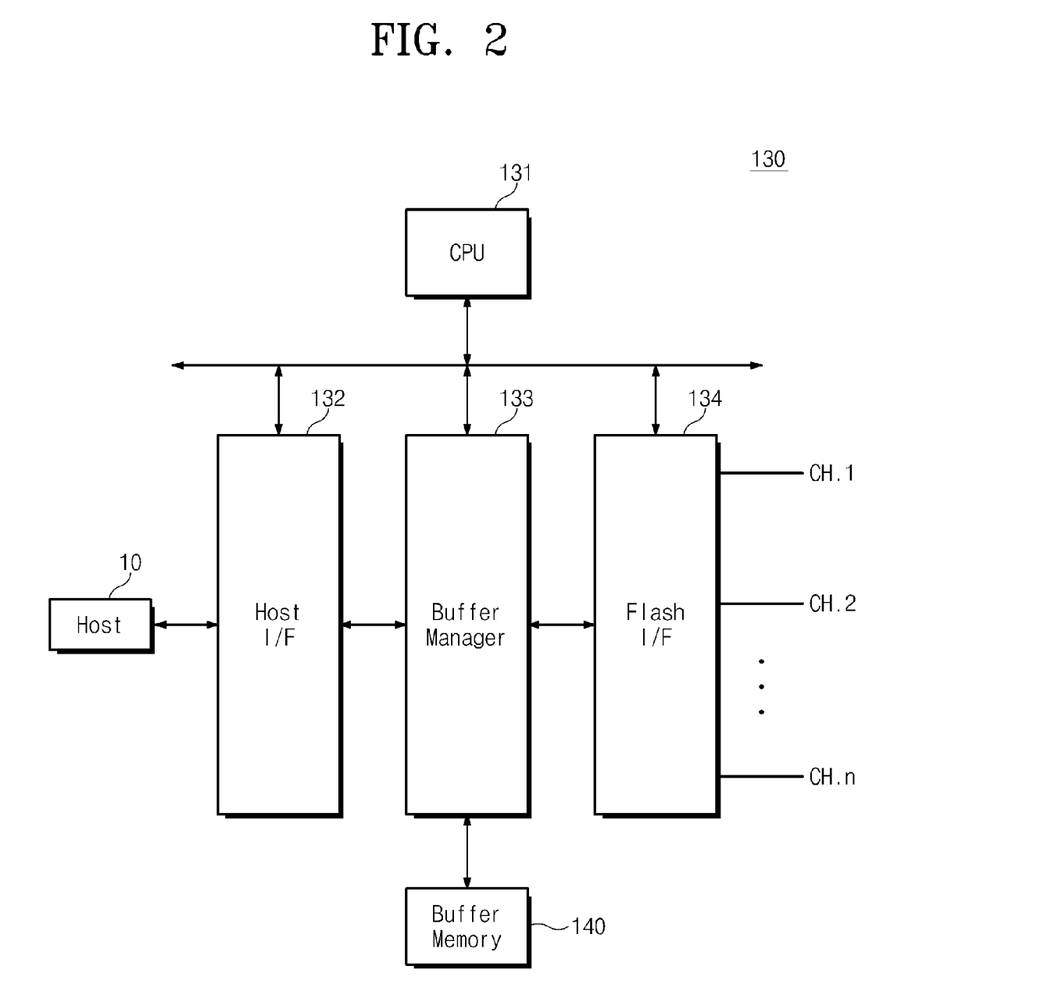
FIG. 2 is a block diagram illustrating an SSD controller of FIG. 1.

FIG. 2 is a block diagram illustrating an SSD controller of FIG. 1. Referring to FIG. 2, SSD controller 130 may include a Central Processing Unit (CPU) 131, a host interface 132, a buffer manager 133, and a flash interface 134.

The CPU 131 may execute a command CMD provided from the host according to the operation mode OP_mode inputted from the power manager 120. The CPU 131 may be operated in a driving condition according to the operation mode OP_mode. The CPU 131 may issue arbitrary commands (e.g., predetermined commands) using values of control registers (not illustrated) in a host interface of host 10 or a flash interface 134.

The CPU 131 may deliver control information for read/write operations to the registers of the host interface 132 and/or flash interface 134. For example, if a command CMD is received from the outside (e.g., from host device 10), the command CMD may be stored in the register (not illustrated) of the host interface 132. According to the stored command, the host interface 132 may inform the CPU 131 (e.g., the host interface 132 may provide an instruction, provide a command signal, etc. to the CPU 131) that the read/write operations were inputted. Such an operation may also occur between the CPU 131 and the flash interface 134. The CPU 131 may control the respective components (e.g., the host interface 132, the buffer manager 133, the flash interface 134, etc.) according to firmware to drive the SSD 100.

The host interface 132 may provide a physical and/or communicative connection between the host 10 and the SSD 100. That is, the host interface 132 may provide an interface with the SSD 100 corresponding to a bus format of the host 10. Examples of the bus formats of the host may include, but are not limited to, Universal Serial Bus (USB), Small Computer System Interface (SCSI), PCI express, ATA, Parallel ATA (PATA), Serial ATA (SATA), and Serial Attached SCSI (SAS).

The host interface 132 may support disk emulation to assist the host 10 to recognize the SSD 100 as a HDD. For example, the host interface 132 may provide a Flash Translation Layer (FTL) to hide a delete operation.

The buffer manager 133 may control the read/write operation of the buffer memory (e.g. buffer memory 140 illustrated in FIG. 1 and described above). For example, the buffer manager 133 may store write data or read data in the buffer memory 140 temporarily. The buffer manager 133 may adjust the frequency of a driving clock of the buffer memory 140 according to a control signal received by the CPU 131 when the CPU 131 is in a low-power mode. That is, the consumption power of a volatile memory (e.g., synchronous DRAM (SDRAM) mounted to provide a large-capacity buffering) may be according to a clock frequency. Accordingly, if the operation mode OP_mode is set to a low-power mode, the buffer manager 133 may control the buffer memory 140 to operate at a clock frequency lower than a clock frequency of the normal mode.

The flash interface 134 may transmit/receive data to/from at least one of the memory devices 150, 160 and 170. The flash interface 134 may selectively provide and/or scatter data that is delivered from the buffer memory 120 into the respective channels CH.1, CH.2, . . . , CH.n. Data read from at least one of the memory devices 150, 160 and 170 provided through the channels may be collected by the flash interface 134. The collected data may be stored in the buffer memory 140.

The flash interface 134 may adjust a channel bandwidth/interleaving manner or a channel frequency with respect to the memory devices 150, 160 and 170 according to control of the CPU 131. The CPU 131 may control the configuration of the flash interface 134 with operation parameters corresponding to the operation mode OP_mode. The respective channels CH.1, CH.2, . . . , CH.n and/or the interleaving of the memory devices connected to the respective channels may be adjusted.

If the operation mode OP_mode is the normal mode, at least one or all of the channels may be activated, and the interleaving of the respective channels may be maximized. Alternatively, a portion of the channels may be activated (e.g., a selected one or more channels) according to the operation mode OP_mode, and the interleaving size of the activated channels may be less than or equal to a predetermined number. That is, the flash interface 134 may access memory devices when the memory devices are in a state of being configured with the operation parameters corresponding to the operation mode OP_mode.

By such features of the SSD controller 130, the execution mode of an inputted command may be variously changed according to the amount of power that is being currently consumed in the SSD 100. That is, the inputted command may be executed in a low-power mode, or may be switched into a stand-by mode, thereby blocking a power source error of the SSD 100 or the host 10 provided with the SSD 100.

Figure 3:
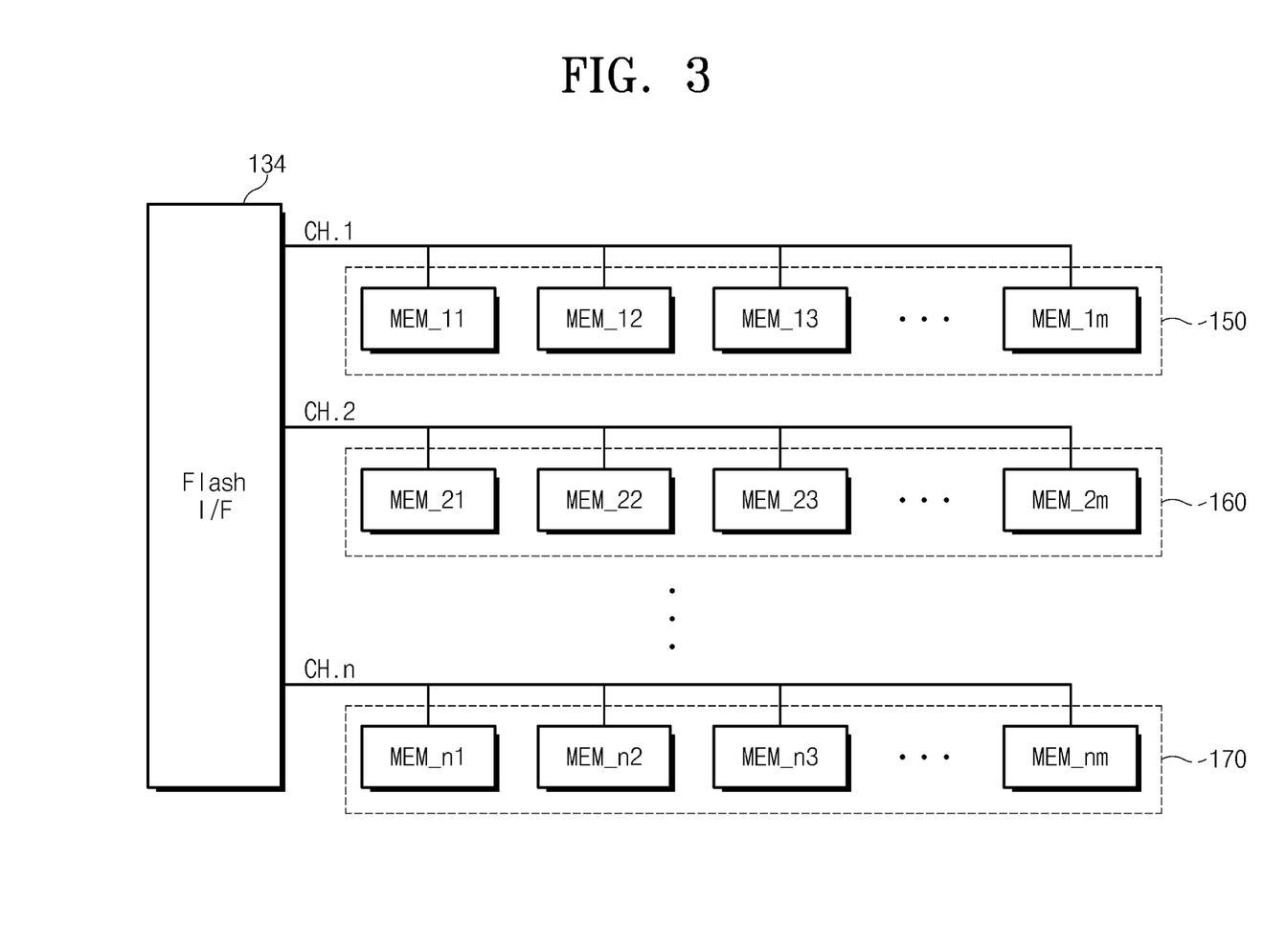
FIG. 3 is a block diagram illustrating communicative connectivity between a flash interface of FIG. 2 and memory devices.

FIG. 3 is a block diagram illustrating a channel configuration between the flash interface 134 of FIG. 2 and the memory devices (e.g., memory device 150, 160 and 170) controlled by the flash interface 134. Referring to FIG. 3, the flash interface 134 may be connected to the respective memory devices (e.g., memory device 150, 160 and 170) through a plurality of channels CH.1, CH.2, . . . , CH.n.

Respective input ports (for example, 8-bit I/O port) of m (m is a natural number) memory devices (MEM_11, MEM_12, . . . , MEM_1m) 150 may be connected to the first channel CH.1. Similarly, in the second and third channels CH.2 and CH.3, the plurality of memory devices 160 and 170 may share input ports in the same manner, respectively. If the operation mode OP_mode is provided from the power manager (120 of FIG. 1), the CPU (131 of FIG. 2) may decode the operation mode OP_mode and store the operation mode OP_mode in the register (not illustrated) of the flash interface 134. The number of channels that are simultaneously activated among the plurality of channels may be determined by the information stored in the register. Also, the number (and/or way of interleaving) of memory devices that are simultaneously selected for interleaving in the respective channels may be determined by the information stored in the register.

Figure 4:
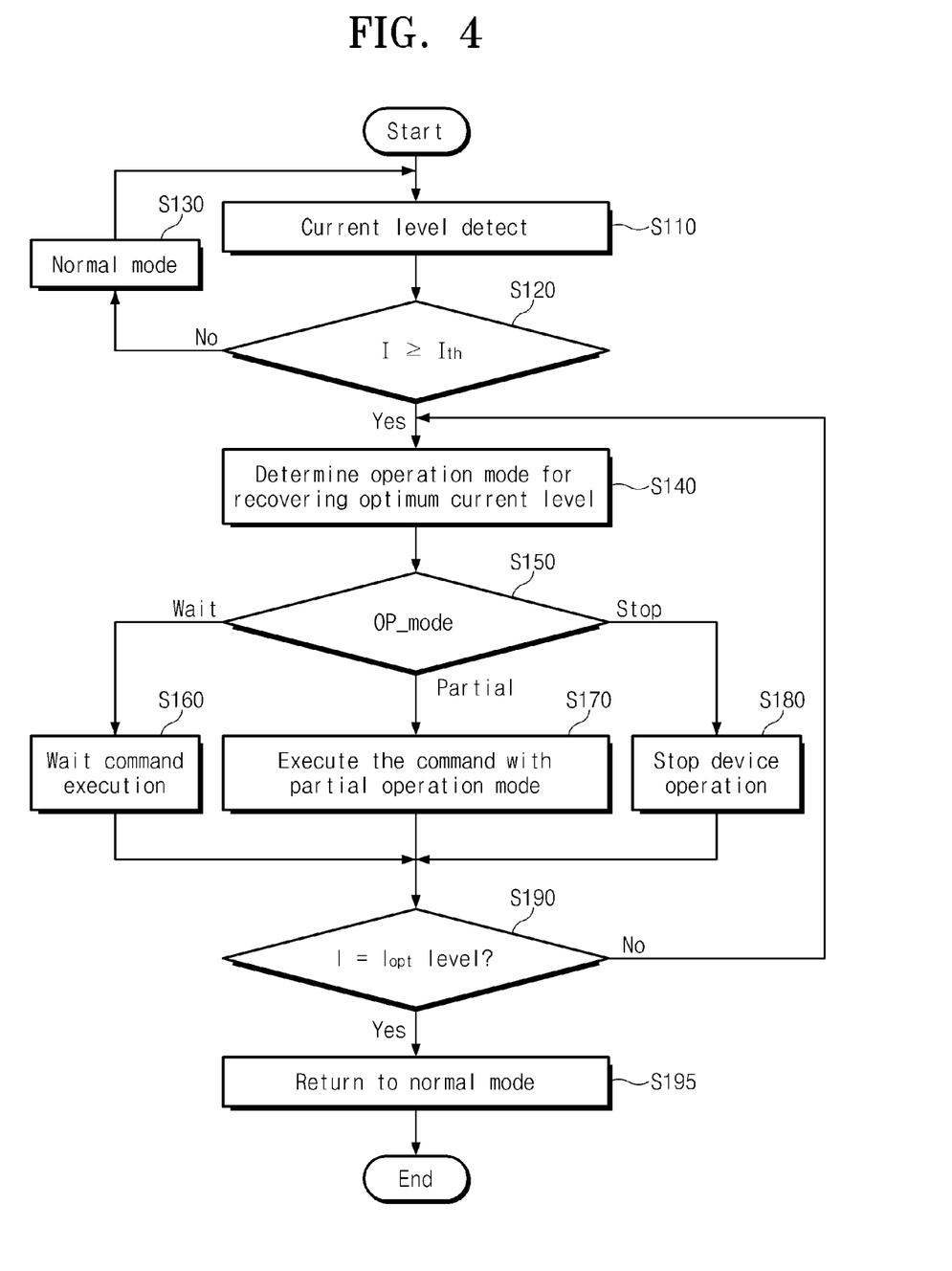
FIG. 4 is a flowchart illustrating an operation method according to exemplary embodiments of the present general inventive concept.

FIG. 4 is a flowchart illustrating an operation method according to exemplary embodiments of the present general inventive concept. Referring to FIG. 4, an SSD 100 may generate an operation mode OP_mode from the magnitude of a current that is being consumed. An inputted command CMD can be executed according to the operation mode OP_mode.

In operation S110, a consumed-current level can be detected by a current detector 110 and a power manager 120. In operation S120, a current (I) that is being consumed in the SSD 100 can be compared with a predetermined threshold current value $I_{th}$. If the current I that is being consumed in the SSD 100 is less than the threshold current value $I_{th}$, in operation S 130, the SSD 100 may be driven in a normal mode at a predetermined maximum performance without additional power management. When the SSD 100 is driven in the normal mode, operation S130 detects the consumed current level continuously.

However, if the current I that is being currently consumed in the SSD 100 is equal to or greater than the threshold current value $I_{th}$, the consuming current of the SSD 100 is recovered to the optimum current level at operation S140. The power manager 120 can select the optimum operation mode OP_mode from low-power modes to recover the consuming current of the SSD 100 to the optimum current level by referring to the detected current level in operation S140.

The operation mode OP_mode selected by the power manager 120 may be variously configured according to the characteristics of the SSD 100. However, for convenience of explanation, it will be assumed in the exemplary embodiments of the present general inventive concept as described herein that the operation mode OP_mode includes at least a wait mode, a partial operation mode, and a stop mode in operation S150.

In operation S150, if the wait mode is delivered OP_mode from the power manager 120 as an operation mode, the SSD controller 130 can delay the execution of the received input command CMD and can wait for a predetermined period of time. The level of the current that is being used may not be increased, and may be lowered to a predetermined level in operation S160.

If the partial operation mode is delivered from the power manager 120 as an operation mode, the SSD controller 130 can divide the execution corresponding to the currently inputted command CMD into a plurality of steps and executes the respective steps. That is, the detailed operations may be serially performed. Alternatively, the bandwidth of a channel or the number of memory devices for interleaving may be reduced for access to the memory devices 150, 160 and 170. The clock frequency to drive the channel or the buffer memory 140 may be reduced, and dynamic current consumption can be reduced in operation S170.

If the stop mode (stop device operation) is delivered from the power manager 120 as an operation mode, the SSD controller 130 can stop one or more environments to drive the SSD 100. The level of a current consumed by the SSD 100 may be minimized in operation S180.

The level of the current provided from the power source of the SSD 100 may be reduced by one of the operation modes OP_mode corresponding to the selected low-power mode. A change of the current may be detected by the current detector 110. In operation S190, it may be determined by the power manager 120 whether the magnitude of the changed current I is reduced to the optimum current level $I_{opt}$.

If the magnitude of the changed current I is determined to be the optimum current level $I_{opt}$ in operation S195, the normal mode may be driven regardless of the level of the current that is being consumed. If the magnitude of the changed current I is not recovered to the optimum current level $I_{opt}$, the operation S140 may carry out an additional change of the operation mode OP_mode.

Although not illustrated herein, a process of adjusting the respective frequencies of internal clock signals (clock signals of CPU 131, a buffer memory 140, and a flash interface 134) of the SSD 100 according to the operation mode OP_mode may be further included in operation S170.

Figure 5A:
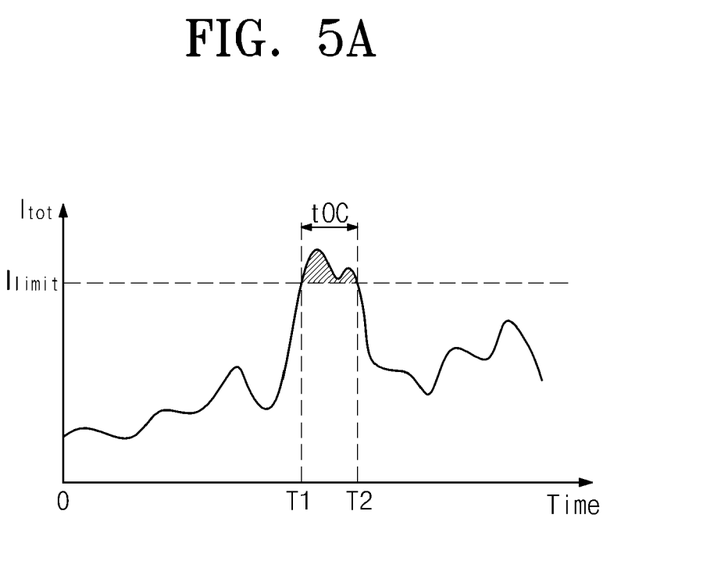
FIGS. 5A and 5B are graphs illustrating effects according to exemplary embodiments of the present general inventive concept.
Figure 5B:
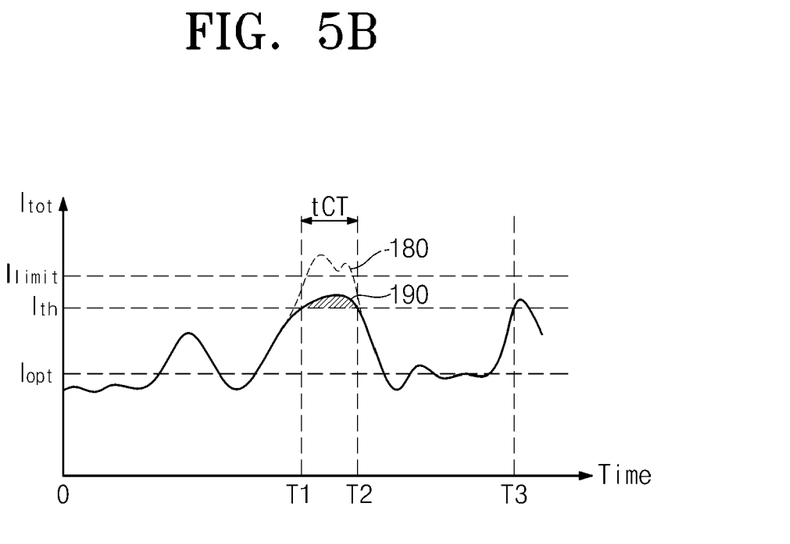

FIGS. 5A and 5B are graphs illustrating changes in operation modes according to exemplary embodiments of the present general inventive concept. FIG. 5A illustrates where there is no change of the operation mode. FIG. 5B illustrates an example of blocking a power source error through a change of the operation mode.

Referring to FIG. 5A, a current peak of the SSD 100 may be generated in a time section T1 to T2 according to a command or an overloaded access operation. The consumed current I of the SSD 100 may exceed a predetermined value of a current supported by a system mounted with the SSD 100 at the peak section tOC. That is, if the consumed current I exceeds the limit current value $I_{limit}$ that the host 10 can support, the entire system including the host 10 may go down (e.g., operation of one or more components of the SSD 100 or the system 300 illustrated in FIG. 8 may be disrupted). The host 10 may forcibly cut the power supply of the SSD 100. In this case, data that is being written to the SSD 100 or data that is temporarily stored in the buffer memory 140 may be lost. Accordingly, minimizing and/or preventing the instantaneous consumption current of the SSD 100, i.e., the peak of the instantaneous consumption current beforehand is required. According to the exemplary embodiments of the present general inventive concept described above, the SSD 100 may forecast a peak current point, and may control operation modes so as not to exceed the limit current value $I_{limit}$.

FIG. 5B illustrates an effect of inhibiting generation of a current peak of the SSD 100 according to exemplary embodiments of the present general inventive concept. The power manager 120 may monitor the level of a detected current provided from the current detector 110. The power manager 120 may have information on the threshold current value $I_{th}$. The power manager 120 may monitor a point (e.g., section tCT) where the level of the detected current provided from the current detector 110 equals and/or exceeds the threshold current value $I_{th}$. If the magnitude of the current consumed in the SSD 100 equals or exceeds the threshold current value $I_{th}$, the power manager 120 may control the SSD controller 130 such that the SSD 100 is driven in a low-power mode.

For example, since the level of the detected current equals and/or exceeds the threshold current value $I_{th}$ at the point T1, a low-power mode operation is executed by the power manager 120 and the SSD controller 130. For example, the execution of an inputted command may be delayed. Alternatively, detailed operations for executing the inputted command are serially performed, or the bandwidth/interleaving manner of the memory device may be modified. Otherwise, parameters may be adjusted to stop the operation of the SSD 100. The consumption current (e.g., as monitored at section tCT) may not exceed the limit current value $I_{limit}$ as illustrates in reference numeral 180, and may be restricted to a value smaller than (e.g., less than) the limit current value $I_{limit}$ as illustrated in reference numeral 190. After switching into a low-power mode, the consumption current may converge into the optimum current level $I_{opt}$. Similarly, the switching of the operation mode may also occur at the point T3. The level of the entire current that is consumed in the SSD 100 may be maintained at or about the optimum current level $I_{opt}$.

Figure 6:
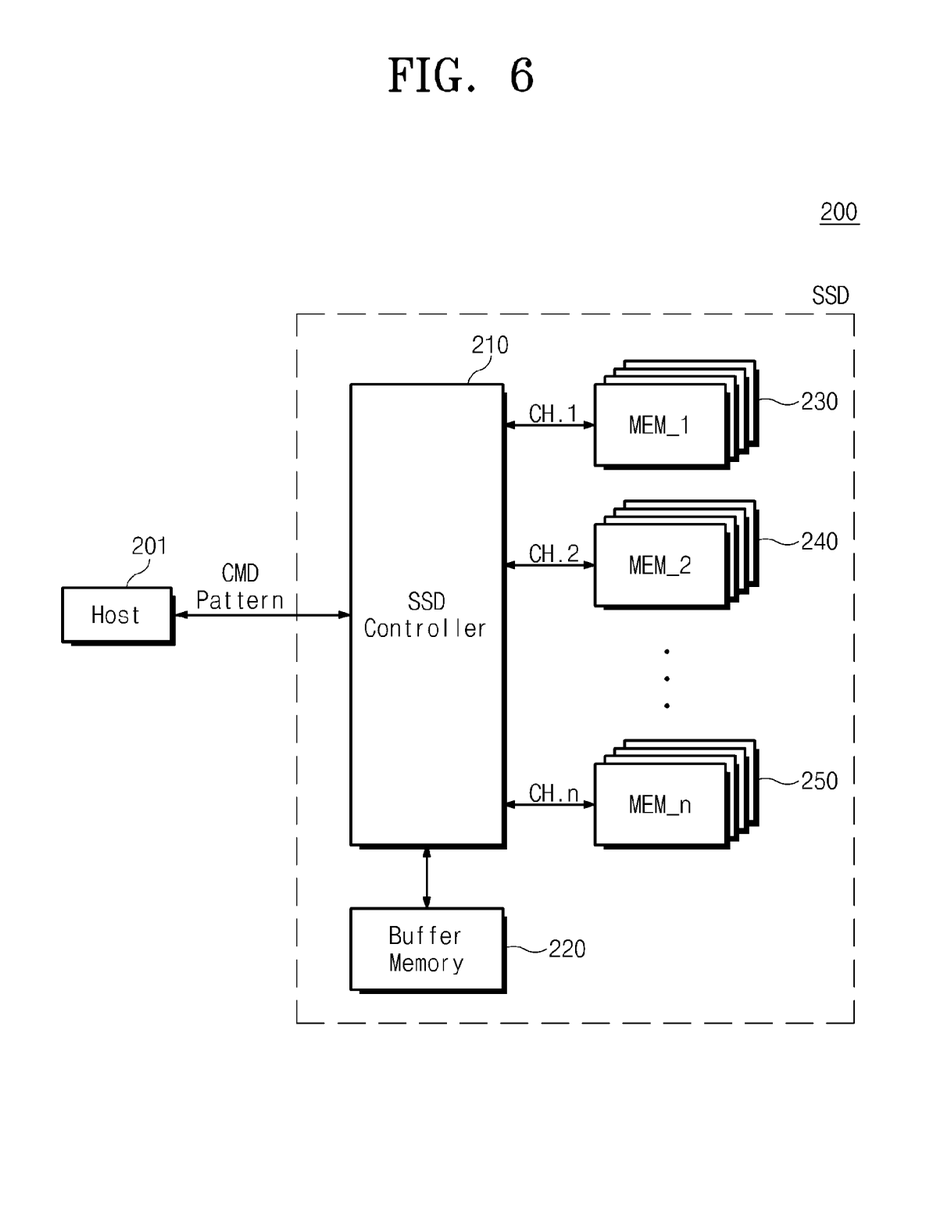
FIG. 6 is a block diagram illustrating an SSD according to exemplary embodiments of the present general inventive concept.

FIG. 6 is a block diagram illustrating an SSD 200 according to exemplary embodiments of the present general inventive concept. The SSD 200 may adjust an operation mode in response to one or more commands, and/or patterns of commands CMD, provided from a host (e.g., host 201). A host 201 may be a personal computer, server, central processing unit (CPU), processor, controller, field programmable gate array, ASIC (Application Specific Integrated Circuit), cellphone, personal digital assistant, digital processing device, etc. that is communicatively coupled to the SSD 200 via a wired and/or wireless network, data bus, or data path.

An SSD controller 210 may monitor patterns of commands received as input from the host 201. That is, the SSD controller 210 may monitor the commands provided from the host 201 to determine whether to induce relatively large power consumption during execution (e.g., induce power consumption that is equal to or greater than a predetermined level of power consumption). For example, the SSD controller 210 may monitor a queue of provided commands (e.g., one or more commands provided from the host 201 that are received by the SSD controller 210). In case of continuous performance, it may be determined whether a received command pattern in which the consumption current exceeds a predetermined current value (for example, $I_{th}$ or $I_{limit}$) exists. If a command pattern in which the consumption current exceeds a predetermined current value is detected, the SSD controller 210 may adjust the parameters to switch the SSD 200 into a low-power mode.

For this operation, in case of continuous performance, the SSD controller 210 may include information on one or more command patterns in which the consumption current exceeds a predetermined current value (for example, $I_{th}$ or $I_{limit}$) exists. Such a command pattern will be referred to as a large-current inducing command pattern. The large-current inducing command pattern may be provided to the SSD controller 210 in the form of a list or table through a test measurement, or may be provided to the SSD controller 210 in any other suitable manner so as to carry out the exemplary embodiments of the present general inventive concept as described herein. The large-current inducing command pattern may be stored in at least one of a memory device 230, 240 and 250, and may be provided to the SSD controller 210 upon booting.

When the large-current inducing command pattern is detected, the SSD controller 210 may be switched into a low-power mode, which can be performed in response to a detection of the large-current inducing command pattern. This switching may be similar or identical to the switching into a low-power mode described in connection with FIG. 1. The exemplary embodiments of the present general inventive concept may be implemented through a firmware configuration of the SSD controller 210 without an additional particular configuration.

Figure 7:
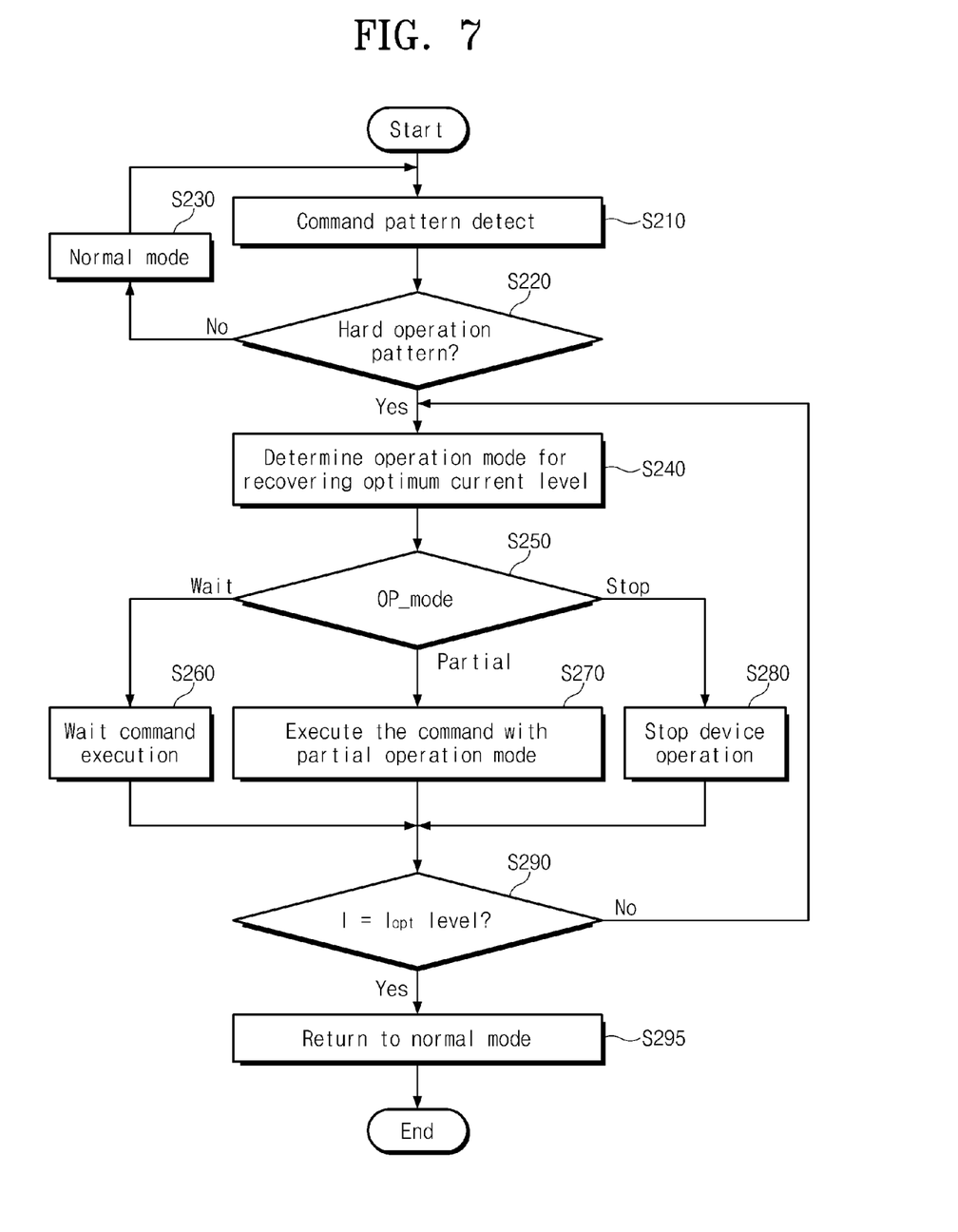
FIG. 7 is a flowchart illustrating an operation method according to exemplary embodiments of the present general inventive concept.

FIG. 7 is a flowchart illustrating an operation method of the SSD 200 according to exemplary embodiments of the present general inventive concept. Referring to FIG. 7, the SSD 200 may monitor a pattern of inputted commands CMD to generate an operation mode OP_mode. The SSD controller 210 may execute the inputted command CMD. Hereinafter, detailed description thereof will be made with reference to the accompanying drawings.

A SSD controller 210 may monitor a command pattern. For example, in operation S210, the SSD controller 210 may monitor a command queue of a host 201 to detect the command patterns that may generate a large current. In operation S220, it is determined whether the detected command pattern is a pattern that may generate a large-current or not. If the detected command pattern is a pattern that may not generate a large-current (i.e., the "No" direction), the inputted command may be executed in the normal mode at operation S230, and may continuously detect the command patterns at operation S210.

If the detected command pattern is a pattern (e.g., hard operation pattern) that may generate a large-current (i.e., the "Yes" direction), a low-power mode may be switched into at operation S240. The SSD controller 210 can determine one of optimum low-power modes corresponding to the command pattern as an operation mode OP_mode at operation S240.

The operation mode OP_mode selected by the SSD controller 210 may be variously configured according to the characteristics of the SSD 200. However, for convenience of explanation, it will be assumed in the exemplary embodiments described herein that the operation mode OP_mode includes at least a wait mode, a partial operation mode, and a stop mode in operation S250.

If the wait mode is selected as an operation mode, the SSD controller 210 may delay the execution of the received input command CMD and waits. The level of the current that is being used may not be increased anymore, and may be lowered to a predetermined level in operation S260.

If the partial operation mode is selected by the power manager 120 as an operation mode, the SSD controller 210 can divide the execution corresponding to the currently inputted command CMD into a plurality of steps and can execute the respective steps. That is, the bandwidth of a channel or the number of memory devices for interleaving may be reduced for access to at least one of the memory devices 230, 240 and 250. The clock frequency to drive the channel or the buffer memory 220 may be reduced, and the dynamic current consumption can be reduced in operation S270.

If the stop mode (i.e., stop device operation) is selected by the power manager 120 as an operation mode, the SSD controller 210 can stop one or more environments to drive the SSD 200, and the level of a current that the SSD 200 consumes may be minimized in operation S280.

The level of the current provided from the power source of the SSD 200 may be reduced by one of the selected operation modes OP_mode. A change of the current may be detected by the SSD controller 210. In operation S290, it may be determined whether the magnitude of the changed current I is reduced to the optimum current level $I_{opt}$.

If the magnitude of the changed current I is recovered to the optimum current level $I_{opt}$, in operation S295, the normal mode may be driven regardless of the level of the current. If the magnitude of the changed current I is not recovered to the optimum current level $I_{opt}$, the operation mode OP_mode may be changed at least once at operation S240.

Although not illustrated herein, a process of adjusting the respective frequencies of internal clock signals (e.g., clock signals of CPU, a buffer memory 220, and a flash interface) of the SSD 200 according to the operation mode OP_mode may be included in operation S270.

The exemplary embodiments of the present general inventive concept illustrated in FIGS. 6 and 7 and described herein disclose that the SSD 200 can be switched into a low-power mode by detection of command patterns. In data processing systems such as mobile devices, the SSD 200 can provide longer-lasting life and stability of the system.

Figure 8:
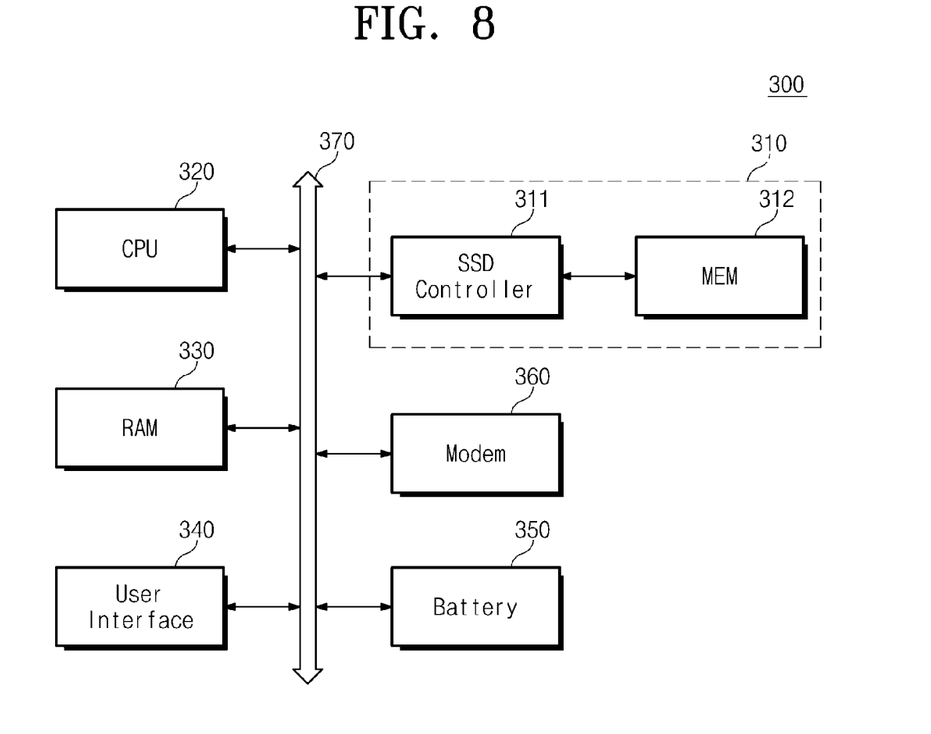
FIG. 8 is a block diagram illustrating a computing system according to exemplary embodiments of the present general inventive concept.

FIG. 8 is a block diagram illustrating a computing system 300 mounted with a SSD 310 according to exemplary embodiments of the present general inventive concept. Referring to FIG. 8, the computing system 300 may include a microprocessor 320, a RAM 330, a user interface 340, a battery 350, a modem 360, and an SSD 310, which are communicatively and/or electrically connected to a system bus 370. The SSD 310 may include a SSD controller 311 and a memory device 312. N-bit data (N is a positive integer) that is processed by the microprocessor 320 can be stored in the memory device 312 through the SSD controller 311. Although not illustrated, it will be apparent to those skilled in the art that the computing system 300 may further include an application chipset, a camera image processor (CIS), and a mobile DRAM.

The SSD 310 may further include Multimedia Card (MMC card), Secure Digital Card, Micro SD card, Memory Stick, ID card, PCMCIA card, Chip Card, USB card, Smart Card, and Compact Flash Card (CF card).

The memory device 312 may include a flash memory device that can maintain stored data even when powered off. As the use of mobile devices such as cellular phones, PDA digital cameras, portable game consoles, and MP3 increases, flash memory devices may be used as a data storage or a code storage. The SSD 310 including the memory device 312 and the SSD controller 311 may be applied to home applications such as HDTVs (High Definition Televisions), DVDs (Digital Versatile Disc) players and other optical media players, digital video recorders (DVR), multi-media electronic apparatuses, set-top boxes, routers, and GPS (Global Positioning Systems.

The SSD 310 may be applied to embedded systems, which are mounted as a portion of other devices. The embedded systems may perform predetermined computing tasks that are imposed on the devices including the SSD 310, unlike a typical computer. For this, the embedded system may include a CPU and an operating system, and may execute applications using the operating system to perform a specific task. Generally, the embedded system can be mounted to control home appliances, military devices, industrial devices, communication devices, set top boxes, DTVs (Digital Television), digital cameras, and the like.

A memory device and/or an SSD controller according to exemplary embodiments of the present general inventive concept may be mounted using various forms of packages. For example, the memory device and/or the SSD controller according to exemplary embodiments of the present general inventive concept may be mounted using packages such as PoP (Package on Package), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), Thin Quad Flat Pack (TQFP), System In Package (SIP), Multi Chip Package (MCP), Wafer-level Fabricated Package (WFP), and Wafer-Level Processed Stack Package (WSP), or any other suitable package to carry out the exemplary embodiments of the present general inventive concept as described herein.

In the example embodiments of the present general inventive concept as described herein, driving modes of performing inputted commands can be changed according to the magnitude of a current consumed in internal operations. Therefore, it is possible to block instability of a data processing system that may be caused by a rapid increase of instantaneous consumption power.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

The above-disclosed subject matter and exemplary embodiments are to be considered illustrative and not restrictive, and the appended claims are intended to cover all such modifications, enhancements, and other embodiments, which fall within the true spirit and scope of the present general inventive concept. Thus, to the maximum extent allowed by law, the scope of the present general inventive concept is to be determined by the broadest permissible interpretation of the following claims and their equivalents, and shall not be restricted or limited by the foregoing detailed description. It would be appreciated by those skilled in the art that changes may be made in these embodiments without departing from the principles and spirit of the general inventive concept, the scope of which is defined in the claims and their equivalents.

What is claimed is:

1. A data storage device, comprising:
   a plurality of memory devices;
   a detector to detect a current inputted from a power source; and
   a power manager to manage consumption power of the plurality of memory devices according to a result of the detection provided from the detector, and to manage power in a normal mode that does not restrict the consumption power, and one of a plurality of low-power modes to adjust the consumption power to less than or equal to a predetermined level according to the result of the detection, the plurality of low-power modes including at least one of a wait mode to delay an execution of a command temporarily, a partial operation mode to execute the command partially, and a stop mode to pause an operation of the data storage device.

2. The data storage device of claim 1, wherein the partial operation mode is a mode that serially performs a plurality of detailed operations to execute the command.

3. The data storage device of claim 1, wherein the partial operation mode comprises:
   at least one of a partial band activation mode to activate a portion of a plurality of channels, a partial interleaving mode to adjust one or more memory devices interleaving-accessed in an activated channel, and one or more low frequency modes to reduce a data transmission rate of an activated channel.

4. The data storage device of claim 1, wherein, when a magnitude of an inrush current is increased to be greater than or equal to a threshold current value, the power manager switches an operation mode into one of the plurality of low-power modes.

5. The data storage device of claim 1, further comprising:
   a memory controller connected to the plurality of memory devices through a plurality of channels and to process an inputted command according to a control command received from the power manager.

6. The data storage device of claim 1, wherein the plurality of memory devices, the detector, and the power manager are provided in a Solid State Drive (SSD).

7. A data storage device, comprising:
   a plurality of memory devices; and
   a memory controller to exchange data with the plurality of memory devices in response to one or more external commands, the memory controller to change an operation mode according to a pattern of the one or more external commands that are successively inputted, and when the pattern of the one or more external commands is a pattern that consumes power that is greater than a predetermined level, the memory controller accesses the plurality of memory devices using one of the plurality of low-power modes.

8. A method of operating a data storage device, the method comprising:
- detecting a current level that is consumed by the data storage device;
- comparing the detected current with a predetermined threshold value;
- when the detected current is greater than or equal to the predetermined threshold value, recovering the consumed current level to an optimum current level by selecting at least one operation mode from low-power operation modes with a controller of the data storage device; and
- operating the data storage device in a normal mode when the detected current is less than the predetermined threshold value.

9. The method of claim 8, wherein the selected at least one operation mode is a wait mode, a partial operation mode, and a stop mode.

10. The method of claim 9, wherein when the wait mode is selected as the operation mode, delaying the execution of a received input command received by the controller and waiting for a predetermined period of time.

11. The method of claim 9, wherein when the partial mode is selected as the operation mode, dividing the execution corresponding to the command received by the controller into a plurality of operations and executing the respective operations.

12. The method of claim 11, wherein the plurality of operations are executed serially.

13. The method of claim 9, wherein when the stop mode is selected as the operation mode, stopping one or more environments to drive the data storage device with the controller.

14. The method of claim 8, further comprising:
- determining whether the magnitude of a changed current of the data storage device is reduced to the optimum current level.

15. The method of claim 14, wherein when the magnitude of the changed current is reduced to the optimum level, retuning the data storage device to a normal mode of operation.

16. The method of claim 14, wherein when the magnitude of the changed current is not reduced to the optimum level, changing the operation mode of the data storage device.

* * * * *